March 16, 1954     W. H. RADEKE     2,672,499
BATTERY CELL INSPECTING AND TESTING SYSTEM
Filed May 23, 1952
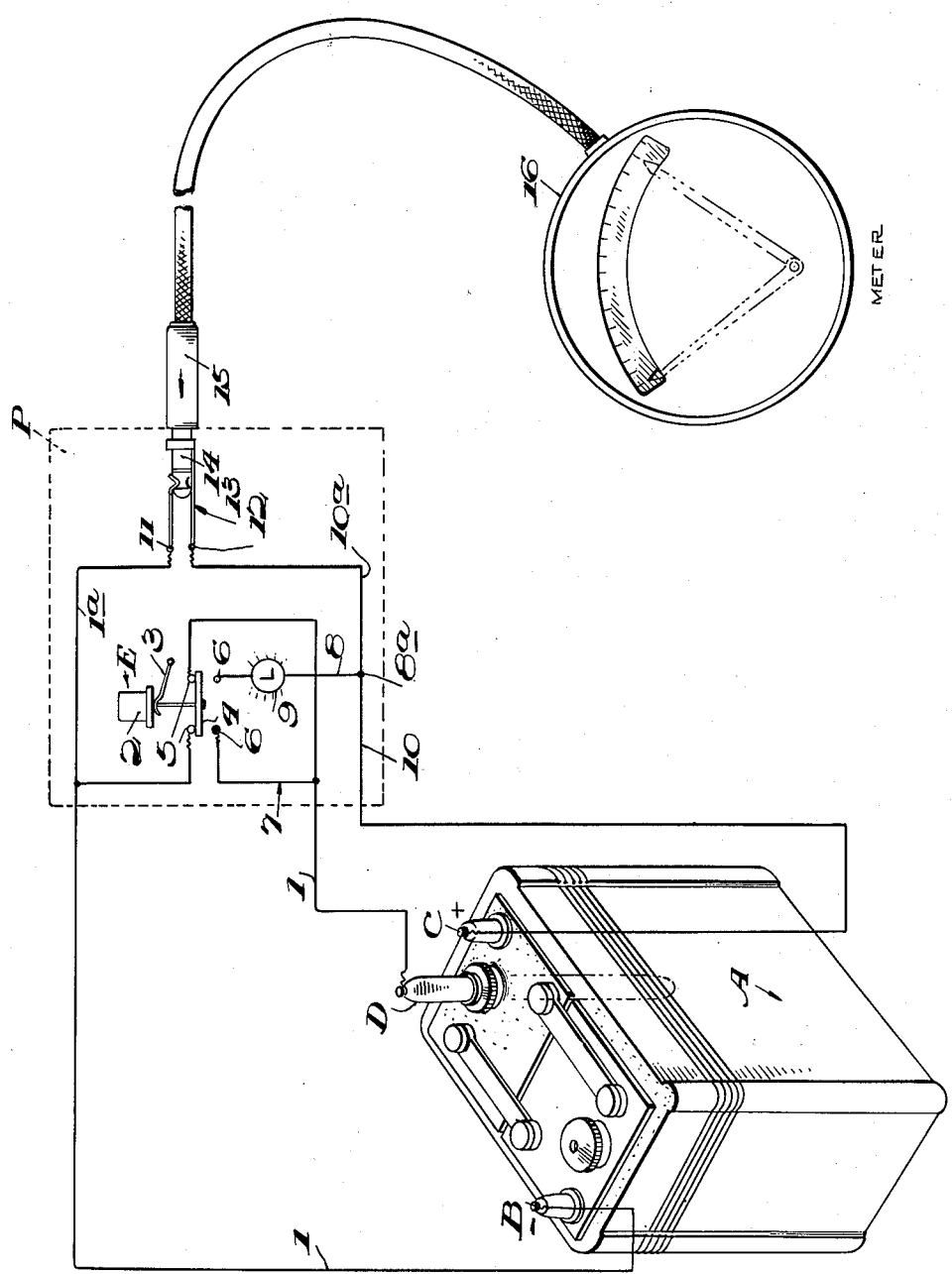
INVENTOR
*Walter H. Radeke*
BY 
ATTORNEY Patented Mar. 16, 1954

2,672,499

UNITED STATES PATENT OFFICE 2,672,499

BATTERY CELL INSPECTING AND TESTING SYSTEM

Walter H. Radeke, Blue Island, Ill., assignor to Poor & Company, Chicago, Ill., a corporation of Delaware Application May 23, 1952, Serial No. 289,539

2 Claims. (Cl. 136—182)

This invention relates to an improvement in battery cell inspecting and testing systems of the type usually employed on rail cars and is a continuation-in-part of my application Serial No. 223,975, filed May 1, 1951, Patent No. 2,609,409, dated September 2, 1952.

The application above referred to is directed to a battery testing arrangement wherein the water level indicating electrode was continuously maintained in circuit with the negative terminal of the battery to maintain said electrode free of an insulating envelop of bubbles, and the system in which this circuit was included involved a receptacle adapted to receive the terminals of a testing device which was provided with both a level indicating light and a gravity testing meter.

The present invention contemplates removing the level indicating light from the testing instrument itself and placing it on a panel, or other convenient part of the battery box enclosure, so that by the aid of a push button, the battery service man can test the battery or batteries for liquid level by merely pushing the button, and then when it is necessary to also test the gravity, a gravity testing meter may be plugged into a conveniently located jack whose terminals are connected with the positive and negative circuits of the battery.

Accordingly, the present invention carries forward the principal features of my prior application aforesaid but removes the level indicating light from the testing instrument itself and thus makes it possible to use any type of gravity testing meter, while at the same time, giving a liquid level indication by simple and effective means.

One of the objects of the invention is to provide a water level testing system wherein the negative circuit including the negative terminal and the level indicating electrode is provided with a push button normally biased to close a first set of contacts included in said circuit and a second set of contacts, one each of which is respectively connected to the negative circuit and a positive circuit connected with the positive terminal of the battery so that upon manual movement of the push button away from the first set of contacts and in engagement with the second set of contacts, a lamp included in circuit with said second set of terminals will glow promptly if the liquid level of the battery is high enough in relation to the electrode to produce a circuit.

Another object is to provide a testing instrument jack in circuit with the positive and negative circuits to receive the plug of a gravity meter when it is desired to take a reading of this type.

A preferred and practical embodiment of the invention is shown in the accompanying drawing in which:

The figure is a diagrammatic view illustrating the invention.

Referring to the drawing, the battery designated generally as A may be the pilot cell for a series of batteries of the type usually housed within the battery box or compartment of a railway car. This battery is provided with a negative terminal B, a positive terminal C and a water level indicating electrode D. This electrode is preferably of the type illustrated in Patent Number 2,560,962, dated July 17, 1951, and, as there described, comprises a construction which is adapted to complete an electric circuit if the liquid level in the battery is high enough, and on the other hand, will produce no electrical circuit if the liquid level is too low and needs replenishing.

The negative terminal B and the electrode D are connected by a circuit 1—1 which is maintained normally closed by a push button arrangement designated generally as E.

The aforesaid push button arrangement preferably includes the push button itself designated as 2 and which is normally biased by a spring 3 of appropriate type to maintain the bridge 4 thereof normally in engagement with a first pair of contacts 5—5 located in the negative circuit 1—1. The purpose of maintaining the push button 2 normally biased to contacts 5—5 is to maintain a circuit including the negative terminal B and electrode D to keep the latter free of an envelope of bubbles as set forth in my application Serial No. 223,975, now Patent No. 2,609,409.

The bridge 4 of the push button 2, when manually pressed against the force of the spring 3 will engage a second pair of contacts 6—6. These contacts are included in a shunt circuit comprising a conductor 7 connected with one of the said second set of contacts 6 and one branch of the negative circuit 1; and a conductor 8 including a lamp 9, said conductor 8 being connected to the other terminal 6 of the second set of contacts.

The conductor 8 is also connected as at 8a with a positive circuit line 10 which leads to the positive terminal C of the battery. It will thus be seen that when the push button 2 is moved away from the first pair of contacts 5—5 into engagement with the second pair of contacts 6—6, a circuit will be closed to the lamp 9 through one branch of the negative circuit 1 by way of conductor 7 and across the bridge 4 of the push button to the other contact 6 and thence through conductor 8 to the positive line 10, providing of course, the liquid level in the battery is sufficiently high to cause the electrode D to be operative.

The negative circuit 1 is also provided with a branch 1a and the positive circuit connection 10 is provided with a lead 10a respectively connected to the terminals 11 and 12 of a jack receptacle 13. This receptacle is intended to receive the conductor end 14 of a conventional jack 15 connected to a gravity testing meter 16 of any appropriate type.

The push button arrangement E may be mounted on a panel P in the battery box or at any location therein conveniently accessible to a service man.

When it is desired to test the battery A, or other batteries connected with it, for determining whether or not they are sufficiently filled with liquid, it is only necessary to depress the push button 2 to cause bridge 4 to move from the first set of contacts 5—5 to the second set of contacts 6—6. If the liquid level is high enough in the battery or batteries, the lamp 9 will glow and the service man will know that the batteries need no additional liquid. If the lamp 9 does not glow promptly, due to special negative circuit 1—1, the service man will know that the battery needs water.

If the gravity test is desired along with the liquid level test, the jack 14—15 is plugged in the receptacle 13 and the meter 16 will give an appropriate gravity reading.

I claim:

1. In a battery cell inspecting and testing system, the combination, including, a battery having positive and negative terminals and a liquid level indicating electrode, a negative circuit connecting the negative terminal and the electrode, a push button switch operative between a first set and a second set of contacts, means normally biasing the switch to closed position between said first set of contacts included in said negative circuit line to maintain the negative circuit and keep the said electrode free of an insulating envelope of bubbles, a positive circuit line connected with the positive terminal of the battery, a water level indicating lamp included in a shunt circuit connected with one of said terminals of the second set of contacts, and a secondary conductor connecting the negative circuit line with the other terminals of the said second set of contacts, whereby manual movement of the push button from its normal position in engagement with said first set of contacts into engagement with the second set of contacts will cause the lamp to promptly glow if the water level in the battery is high enough to contact the liquid level indicating electrode.

2. In a battery cell inspecting and testing system, the combination, including, a battery having positive and negative terminals and a liquid level indicating electrode, a negative circuit connecting the negative terminal and the electrode, a push button switch operative between a first set and a second set of contacts, means normally biasing the switch to closed position between said first set of contacts included in said negative circuit line to maintain the negative circuit continuously closed except at the instant of test and keep the said electrode free of an insulating envelope of bubbles, a positive circuit line connected with the positive terminal of the battery, a water level indicating lamp included in a shunt circuit connected with one of said terminals of the second set of contacts, a secondary conductor connecting the negative circuit line with the other terminal of the said second set of contacts, whereby manual movement of the push button from its normal position in engagement with said first set of contacts into engagement with the second set of terminals will cause the lamp to promptly glow if the water level in the battery is high enough to contact the liquid level indicating electrode, and gravity tester jack always in circuit with the negative circuit line and the positive circuit line.

WALTER H. RADEKE.

References Cited in the file of this patent

UNITED STATES PATENTS

| Number | Name | Date |
|---|---|---|
| 1,338,170 | Carlon | Apr. 27, 1920 |
| 1,453,602 | Price | May 1, 1923 |
| 1,558,076 | Chamberlain | Oct. 20, 1925 |
| 1,594,814 | Brodin et al. | Aug. 3, 1926 |
| 1,634,176 | Cunliffe | June 28, 1927 |
| 1,724,287 | Krueger | Aug. 13, 1929 |
| 1,818,185 | Yull | Aug. 11, 1931 |
| 2,056,578 | Lepore | Oct. 6, 1936 |